(12) United States Patent
Bhole et al.

(10) Patent No.: US 10,360,132 B2
(45) Date of Patent: Jul. 23, 2019

(54) METHOD AND SYSTEM FOR IMPROVING OPERATIONAL EFFICIENCY OF A TARGET SYSTEM

(71) Applicant: Accenture Global Solutions Limited, Dublin (IE)

(72) Inventors: Laxmikant Sudhakar Bhole, Pune (IN); Amod Dattatray Deshpande, Pune (IN); Ramkumar Kothandaraman, Bangalore (IN); Kiran Vinayak Khambete, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 165 days.

(21) Appl. No.: 15/494,169

(22) Filed: Apr. 21, 2017

(65) Prior Publication Data
US 2017/0329695 A1 Nov. 16, 2017

(30) Foreign Application Priority Data
May 11, 2016 (IN) .............................. 201641016378

(51) Int. Cl.
*G06F 11/00* (2006.01)
*G06F 11/36* (2006.01)
(Continued)

(52) U.S. Cl.
CPC ........ *G06F 11/3612* (2013.01); *G06F 11/302* (2013.01); *G06F 11/3409* (2013.01);
(Continued)

(58) Field of Classification Search
CPC ............. G06F 11/3409; G06F 11/3495; G06F 11/302; G06F 11/3452; G06F 11/3612;
(Continued)

(56) References Cited

U.S. PATENT DOCUMENTS 6,556,950 B1 4/2003 Schwenke et al.
9,189,317 B1 11/2015 Marimuthu
(Continued)

OTHER PUBLICATIONS

Examination Report No. 4 in Australian Patent Application No. 2017202801, dated Sep. 12, 2018, pp. 1-4.
(Continued)

*Primary Examiner* — Charles Ehne
(74) *Attorney, Agent, or Firm* — Brinks Gilson & Lione

(57) ABSTRACT

A method for improving an operational efficiency of a target system includes receiving, by an application lifecycle analyzer (ALA), performance information from the target system. The ALA determines whether the target system is experiencing or is about to experience or may experience a problem based on the received performance information, user activity details and historical trends. The ALA communicates a diagnostic event to a source control system when the ALA determines that a problem exists or is going to occur on the horizon with the target system. The ALA receives, from the source control system, development information that specifies one or more time periods associated with operations for diagnosing and resolving the problem experienced by the target system. In response to receiving the development information, the ALA communicates a build event to a build system, receives an application built by the build system; and deploys the application to the target analyzer.

18 Claims, 20 Drawing Sheets

(51) Int. Cl.
  *G06F 11/34* (2006.01)
  *G06F 11/30* (2006.01)
(52) U.S. Cl.
  CPC ...... *G06F 11/3452* (2013.01); *G06F 11/3466* (2013.01); *G06F 11/3495* (2013.01); *G06F 11/366* (2013.01)
(58) Field of Classification Search
  CPC ... G06F 11/366; G06F 11/3466; G06F 11/368
  See application file for complete search history.

(56) References Cited

U.S. PATENT DOCUMENTS

| | | | |
|---|---|---|---|
| 2005/0091227 A1* | 4/2005 | McCollum | G06F 8/36 |
| 2005/0091642 A1 | 4/2005 | Miller | |
| 2008/0244325 A1 | 10/2008 | Tyulenev | |
| 2013/0014107 A1* | 1/2013 | Kirchhofer | G06F 9/5083 718/1 |
| 2014/0310564 A1* | 10/2014 | Mallige | G06F 11/0781 714/47.1 |

OTHER PUBLICATIONS

Australian Patent Office, Examination Report No. 2 in Australian Application No. 2017202801 dated Jan. 31, 2018, pp. 1-3.
Australian Patent Office, Examination Report No. 3 in Australian Application No. 2017202801 dated May 8, 2018, pp. 1-4.
Australian Patent Office, Examination Report No. 1 for Australian Application No. 2017202801 dated Sep. 26, 2017, 5 pages.

* cited by examiner

METHOD AND SYSTEM FOR IMPROVING OPERATIONAL EFFICIENCY OF A TARGET SYSTEM

RELATED APPLICATIONS

This application claims priority to Indian Patent Application No. 201641016378, filed May 11, 2016, the contents of which are hereby incorporated in their entirety.

FIELD

This application generally relates to server systems for performing various tasks. In particular, this application describes a method and system for improving the operational efficiency of a target system.

DESCRIPTION OF RELATED ART

Many industries utilize cloud computing to provide Internet-based solutions and services. In cloud computing, a cloud computing provider operates a pool of configurable computing resources (e.g., computer networks, servers, storage, applications and services) and allocates portions of these resources to interested clients. The cloud computing provider assumes the burden of maintaining the resources, thus relieving the client of this burden.

In practice, a client may develop an application in-house and deploy the application to a cloud computing resource. However, after deployment, it is difficult for the client to determine how well the application is performing. For example, it is difficult to track bugs in the application, resulting in application down time, unhandled server requests generated by end-users, and slowing down of the equipment upon which the application is operating.

When problems are identified, developers may release patches to fix the application. However, in large-scale applications, the burden of tracking bugs and patches for fixing the same becomes difficult to manage.

BRIEF SUMMARY

In one aspect, a method for improving the operational efficiency of a target system includes receiving, by an application lifecycle analyzer (ALA), performance information from the target system. The ALA determines whether the target system is experiencing or is about to experience or may experience a problem based on the received performance information along with user activity details and historical trends. The ALA communicates a diagnostic event to a source control system when the ALA determines that a problem exists or is going to occur on the horizon with the target system. The ALA receives, from the source control system, development information that specifies one or more time periods associated with operations for diagnosing and resolving problems experienced by the target system. In response to receiving the development information, the ALA communicates a build event to a build system, receives an application built by the build system, and deploys the application to the target analyzer.

In a second aspect, a system for improving an operational efficiency of a target system includes an application lifecycle analyzer (ALA). The ALA is configured to receive performance information from the target system; determine whether the target system is experiencing a problem based on the received performance information; and communicate a diagnostic event to a source control system when the ALA determines that a problem exists with the target system. The system also includes a source control system that is configured to cause one or more operations for diagnosing and resolving problems experienced by the target system to be performed; and to communicate development information that specifies one or more time periods associated with the one or more operations. The ALA is further configured to communicate a build event to a build system in response to receiving the development information; receive an application built by the build system; and deploy the application to the target analyzer.

In a third aspect, a non-transitory storage medium stores instruction code for improving an operational efficiency of a target system. The instruction code is executable by a machine to cause the machine to perform acts that include receiving performance information from the target system; determining whether the target system is experiencing a problem based on the received performance information; communicating a diagnostic event to a source control system when the ALA determines that a problem exists with the target system; and receiving, from the source control system, development information that specifies one or more time periods associated with operations for diagnosing and resolving problems experienced by the target system. In response to receiving the development information, the instruction is further executable by the machine to cause the machine to perform additional acts that include communicating a build event to a build system; receiving an application built by the build system; and deploying the application to the target analyzer

DETAILED DESCRIPTION

The embodiments described below provide a system that tracks issues associated with applications running on one or more target systems, and tracks efforts undertaken to resolve those issues. The system generates statistical data that allows key stakeholders to assess how well the issues are being resolved. The system also provides mechanisms for tracking activity associated with building and deployment of applications to target systems.

Figure 1:
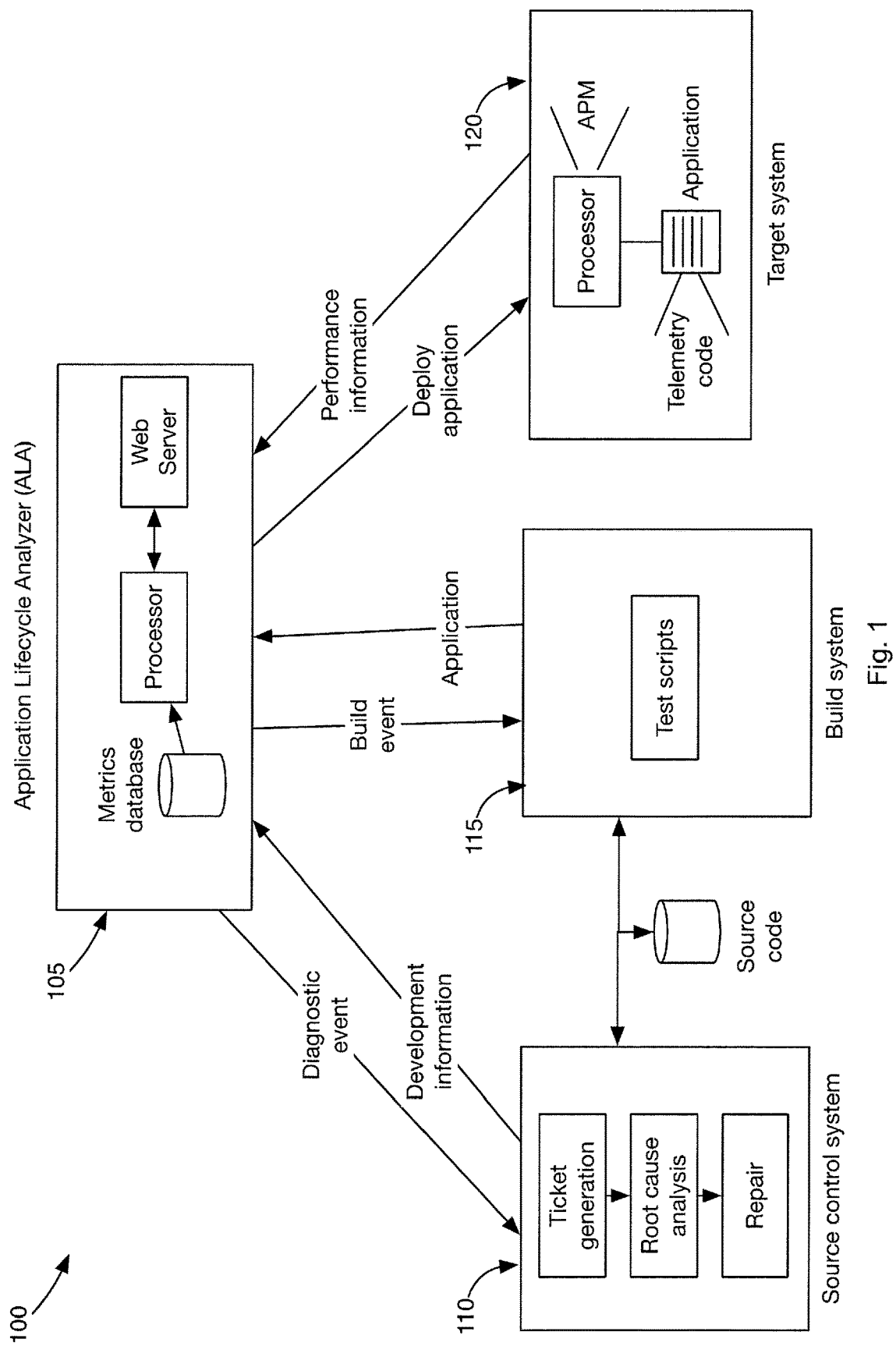
FIG. 1 illustrates an exemplary environment for improving the operational efficiency of a target system.

FIG. 1 illustrates an exemplary environment 100 for improving the operational efficiency of a target system. The environment 100 includes an application lifecycle analyzer (ALA) 105, a source control system 110, a build system 115, and a target system 120.

Each of the systems 105, 110, 115, 120 may correspond to separate computer systems deployed across a network that communicate with one another via the network. In other implementations, one or more of the systems may share certain resources such as a CPU, storage, etc.

While the environment 100 discloses a single source, build and target system, it should be understood that the environment 100 may include a number of source, build and target systems and that the operations described below that are performed by the ALA 105 may be applied to the other source, build and target systems.

As outlined in more detail below, in one embodiment, the ALA 105 receives performance information associated with one or more applications operating on one or more target systems 120. The performance information is utilized to assess the operational status of each target system 120 and each application operating on a given target system 120.

In this regard, each target system 120 may include an application performance monitoring (APM) tool for measuring the hardware and software performance of one or more applications operating on the target system 120. The ALA 105 may be configured to cooperate with the APM tool of each target system 120 to obtain the information from the APM tool. For example, the ALA 105 may control the APM tool and receive information from the APM tool via an application programming interface of the APM tool.

When a problem is detected, the ALA 105 may generate a diagnostic event to the source control system 110 from where the application was derived. In this regard, each source control system 110 may correspond to one of many different types of source controls system. The ALA 105 may be configured to operate with a desired source control system 110 via, for example, an API of the source control system 110.

Upon receiving the diagnostic event, the source control system 110 sets off a series of operations for diagnosing and resolving the problem with the application.

In addition or alternatively, a diagnostic event may be generated by an event generator module deployed on a target system 120 that operates in cooperation with an application programming monitoring (APM) tool deployed on the target system 120 for monitoring and/or reporting problems associated with the target system 120. Upon receipt of the diagnostic event from the event generator module, the ALA 105 may control the corresponding source control system 110 to perform a series of operations to thereby resolve problems that may have triggered the diagnostic event.

Once the problem is indicated as being resolved by the source control system 110, the ALA 105 generates a build event to the corresponding build system 115, which in turn causes the build system 115 to rebuild the application based on updated code from the source control system 110. The ALA 105 then deploys the newly built application to the target system 120.

The ALA 105 tracks diagnostic events along with activities undertaken to resolve any issues that triggered the diagnostic event to determine key performance metrics. For example, the key performance metrics determined by the ALA 105 may include a mean time to closure (MTTC) that defines an average amount of time required for a development team to turn a new feature request from a customer into working software changes deployed to the target system 120, a mean time to repair (MTTR) that corresponds to an average amount of time required to resolve a problem associated with a diagnostic event, a mean time to failure (MTTF) that defines an average amount of time between consecutive determinations that a problem exists on the target system 120 based on received performance information, and a mean time to detect (MTTD) that defines an average amount of time associated with determination of a root cause associated with a diagnostic event. Other key performance metrics may be determined.

Figure 2:
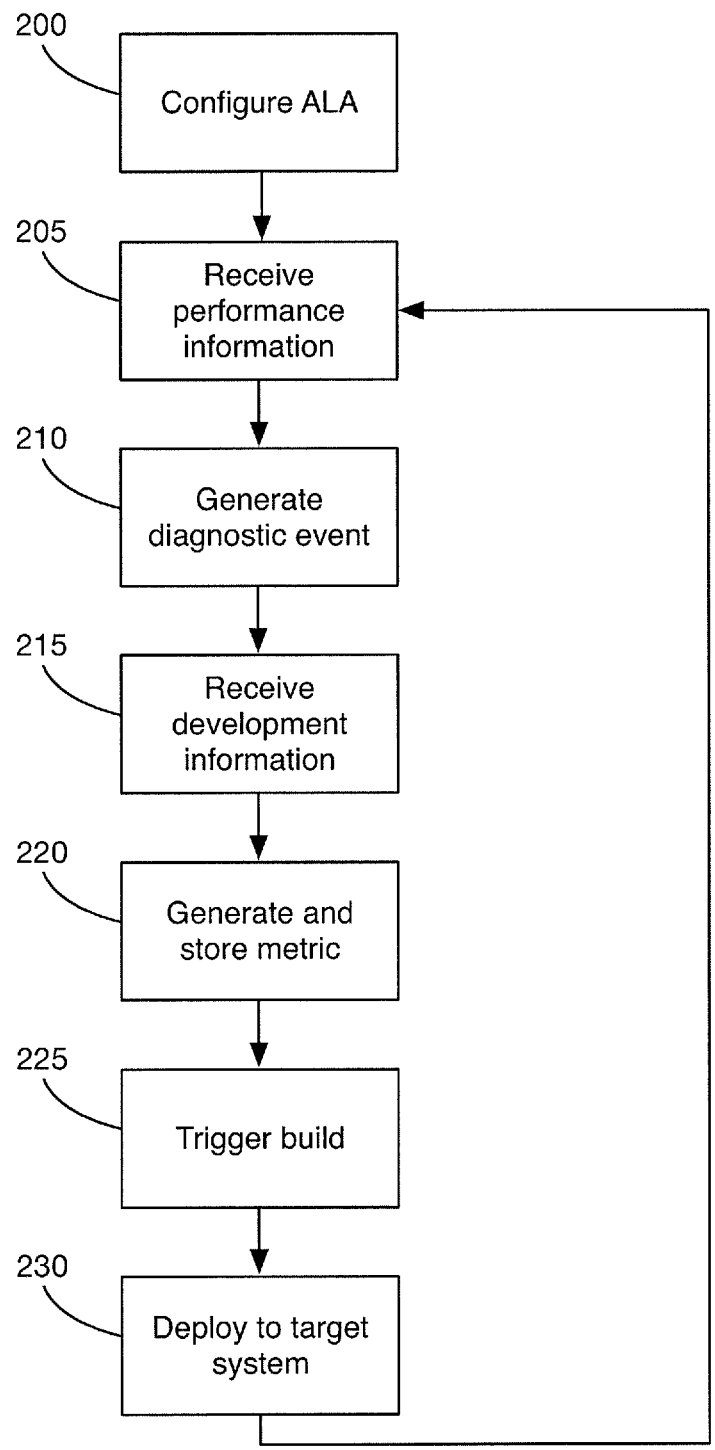
FIG. 2 illustrates exemplary operations that may be performed by one or more of the systems of the environment in improving the operational efficiency of a target system.

FIG. 2 illustrates exemplary operations that may be performed by one or more of the systems described above. In some implementations, the operations may be embodied in the form of instruction code stored in non-transitory media of the systems for causing processors of the systems to perform the operations.

At block 200, the ALA 105 may be configured to operate with a desired target system 120 and a desired source control system 110. In this regard the ALA 105 may include an API that facilitates remotely configuring the ALA 105. In addition or alternatively ALA 105 may be configurable via a graphical user interface accessible via, for example, a web browser. FIGS. 3A-3E illustrate exemplary user interface screens that may be provided via a web browser to facilitate configuration of the ALA 105.

Figure 3A:
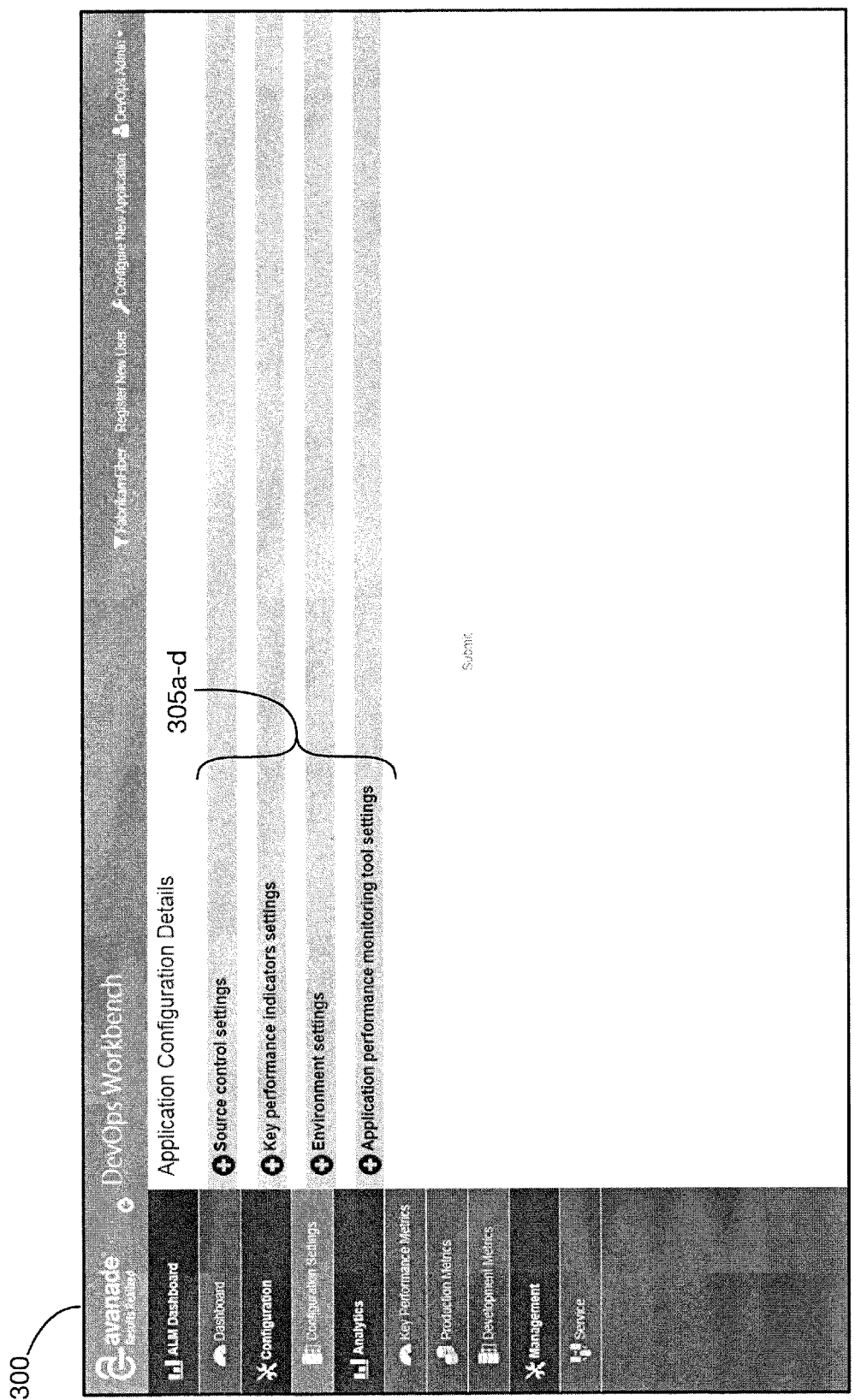
FIGS. 3A-3E illustrate exemplary user interface screens that may be provided to facilitate configuration of an application lifecycle analyzer (ALA) of the an exemplary environment.

Referring to FIG. 3A, a first user interface 300 includes a group of controls 305a-d that facilitate providing source control settings, key performance indicator settings, environment settings, and application performance monitoring tool settings.

Figure 3B:
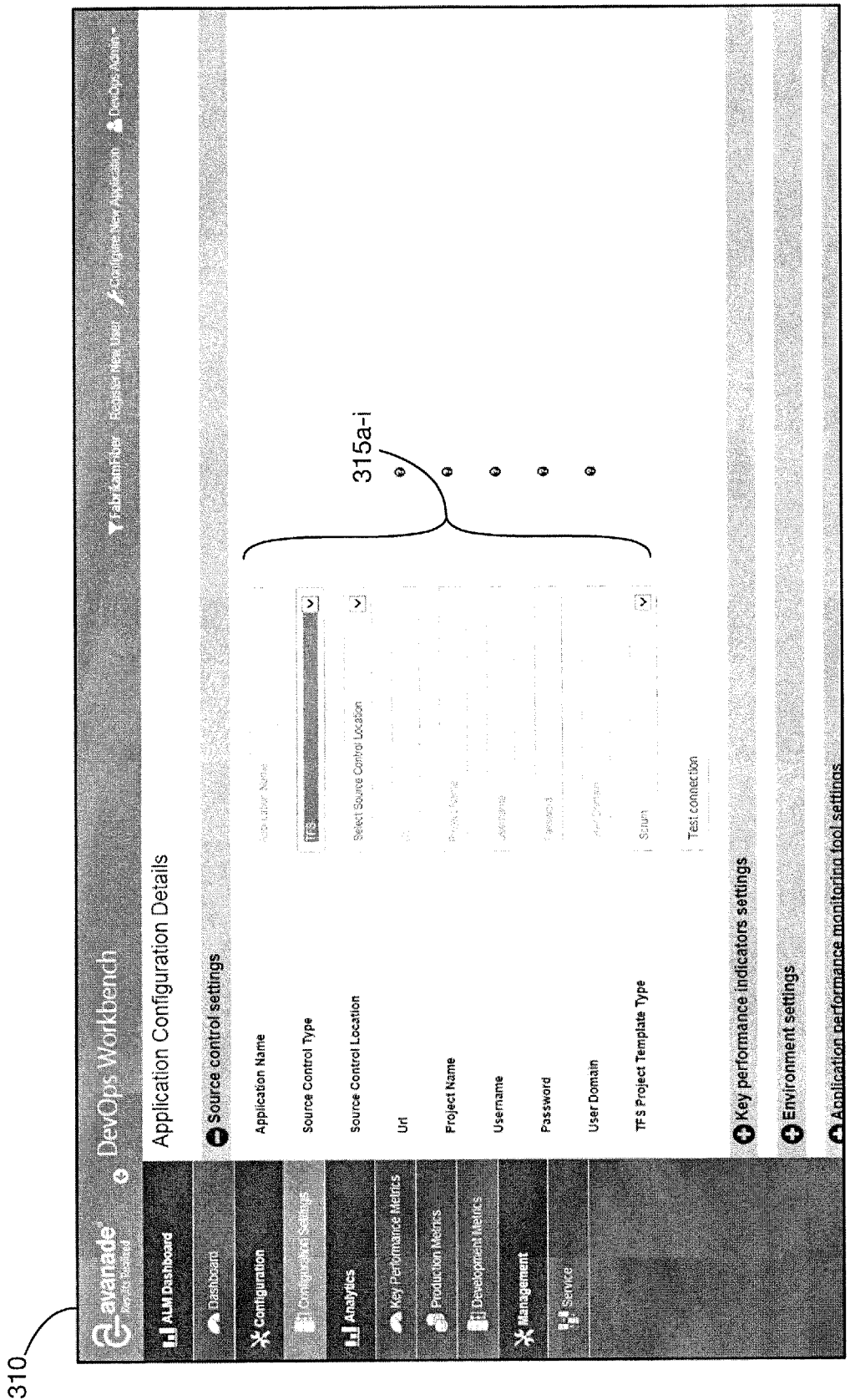

Referring to FIG. 3B, a second user interface 310 includes a groups of controls 315a-i that facilitate configuring various aspects of the source control settings. For example, controls may be provided for specifying the application name (i.e., the name of the application being analyzed) and a source control type (e.g., TFS or GitHub). Once the source control type is specified, relevant controls 315c-315i may be enabled to facilitate providing details associated with the specified source control type. For example, controls may be provided for specifying connection details (e.g., a URL, user domain, etc.) and credentials (e.g., user name, password) that facilitate connecting to the specified source control tool. Controls for specifying other parameters may be provided.

Figure 3C:
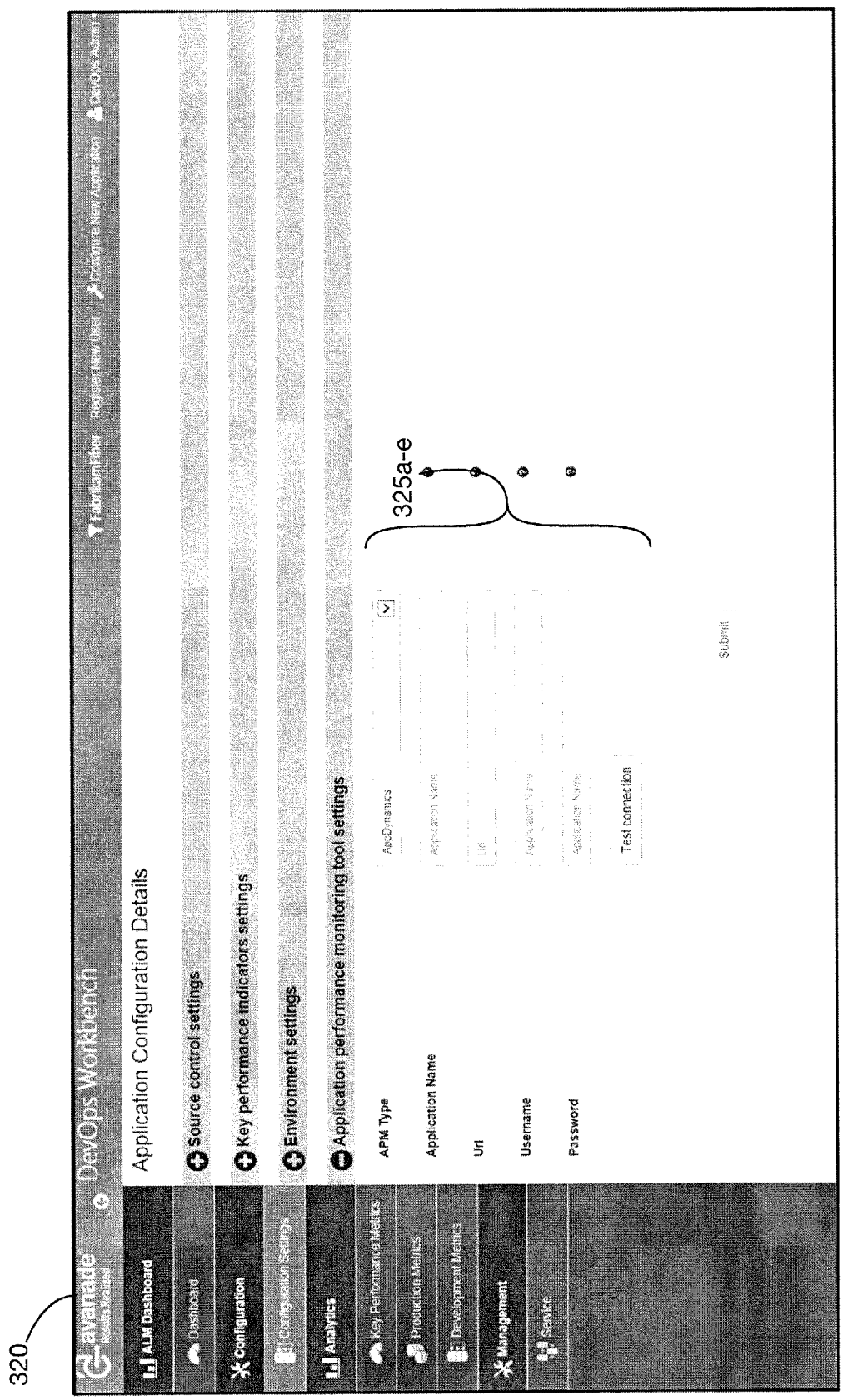

Referring to FIG. 3C, a third user interface 320 includes a group of controls 325a-e that facilitate configuring the application performance monitoring tool settings. For example, controls may be provided for specifying an APM tool type (e.g., AppDynamics, New Relics, Scorn, Application Insights, DynaTrace, Operation Insights). Once the APM tool type is specified, relevant controls 325b-325e may be enabled to facilitate providing details associated with the specified APM tool type. For example, controls may be provided for specifying connection details (e.g., a URL, user domain, etc.) and credentials (e.g., user name, password) that facilitate connecting to the specified APM tool. Controls for specifying other parameters may be provided.

Figure 3D:
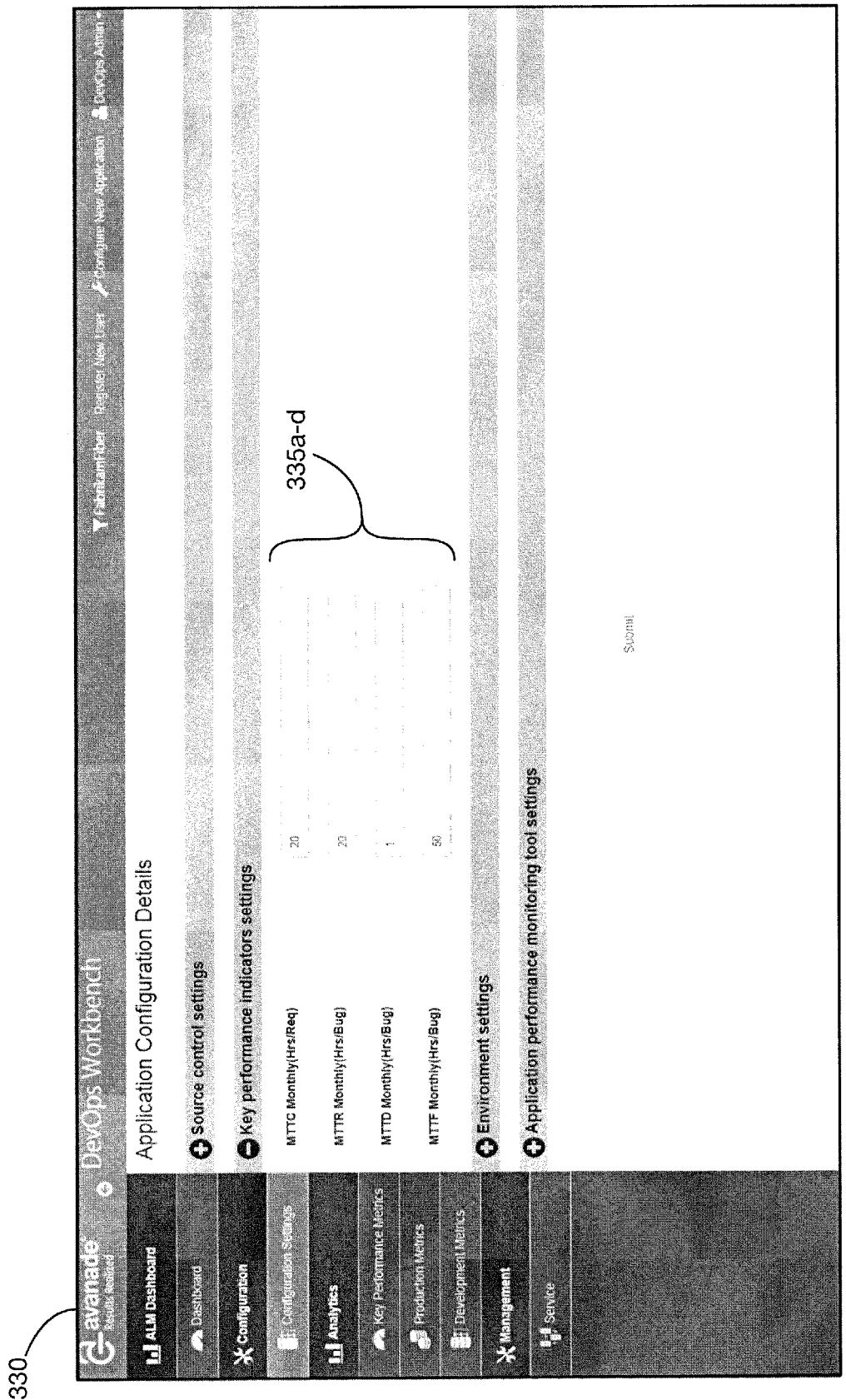

Referring to FIG. 3D, a fourth user interface 330 includes a group of controls 335a-d that facilitate configuring the key performance indicator settings. For example, controls may be provided for specifying threshold values for comparison to the MTTC, MTTR, MTTF, and MTTD described above. The MTTC threshold may be specified in terms of hours per request. The MTTR, MTTF, and MTTD thresholds may be specified in terms of hours per bug.

Figure 3E:
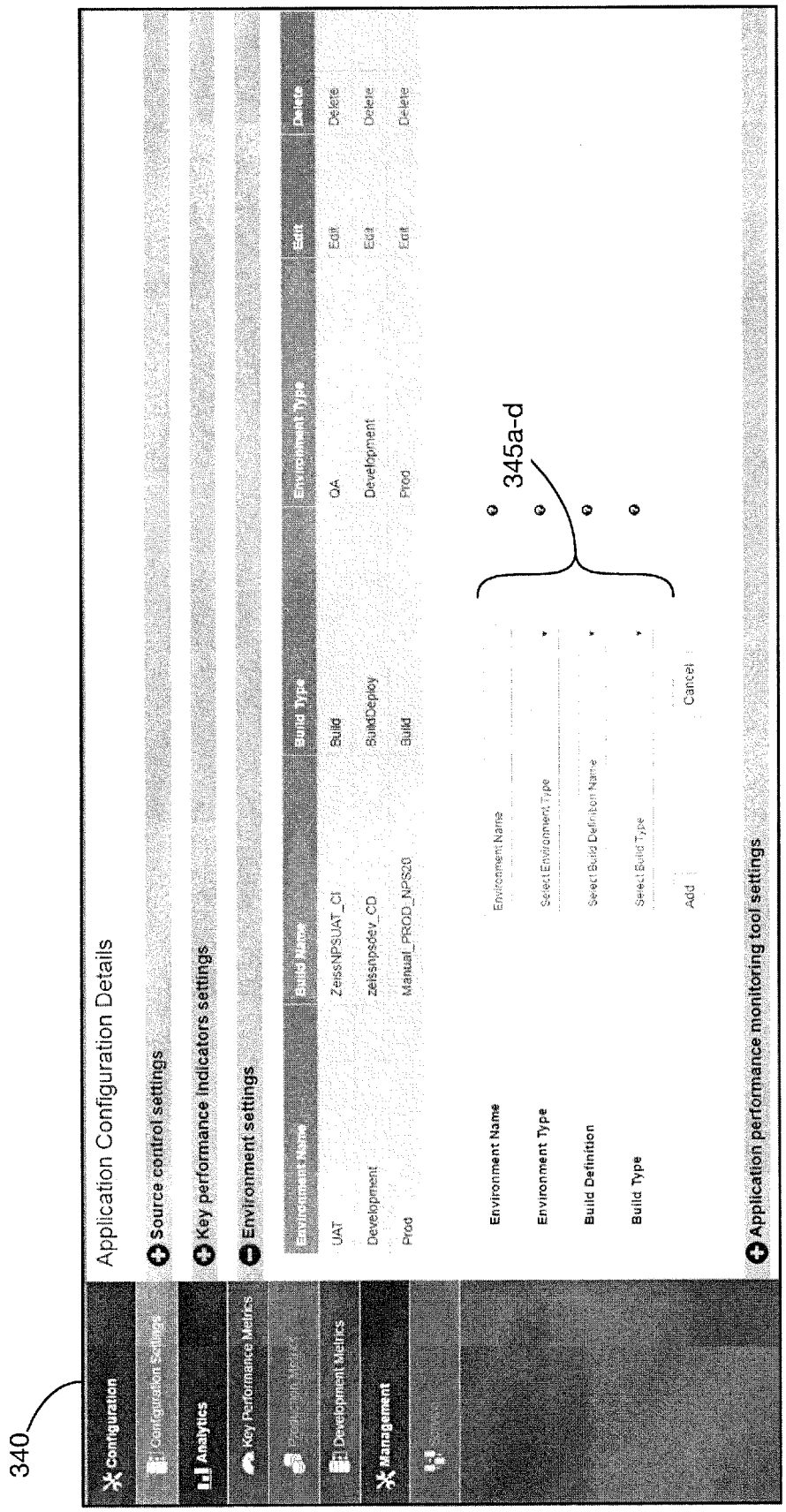

Referring to FIG. 3E, a fifth user interface 410 includes a group of controls 345a-d that facilitate configuring the environment settings. For example, controls may be provided for specifying an environment name (e.g., UAT, Development, Prod, etc.), an environment type (e.g., QA, Development, Prod), or a build type (e.g., Build, Build and Deploy). Controls for specifying additional environment settings may be provided.

At block 205, the ALA 105 may receive performance information such as hardware and/or software performance information from the target system 120 via the APM tool. The hardware performance information may include information that defines CPU performance of the target system 120, memory usage of the target system 120, disk usage of the target system 120, network usage of the target system 120, and or other types of performance metrics associated with the hardware of the target system 120.

The software performance information may include information such as the number of users using the a given application operating on the target system 120, a list of frequently used features of the application, high priority and/or slow running features of the application, and information related to failed business transactions on the targeted system.

In some implementations, the application operating on the target system 120 includes code for logging errors with the application and/or the target system 120. In this case, the performance information may include error information associated with errors logged by the application.

At block 210, the ALA 105 may determine that a problem exists with the target system 120 based on the performance information, user behaviors, failed business transactions, speed of completion of business transactions, trends on earlier bugs generated based on user behavior, system performance parameters, etc., and generate a diagnostic event to the source control system 110. For example, as described in more detail below, a problem may be determined to exist when a performance metric falls outside of an acceptable range. The ALA 105 may include information related to the problem along with information received from the target analyzer, which may be related to the problem, in the diagnostic event.

The ALA 105 may control the behavior of the target system 120 or one or many of its subsystem based on the current status of the target system 120 and/or operational/maintenance demands that may arise in the target system 120 without impacting overall behavior of the target system 120 by deploying intelligent components to the target system 120 and controlling these components remotely. That is, the ALA 105 may remotely control the behavior via the components.

At block 215, one or more operations for diagnosing and resolving the problem may be performed by the source control system 110 in response to receiving the diagnostic event. For example, a trouble ticket may be generated by the source control system 110. The progress of developers working on the problem may be tracked by the source control system 110. Once the problem is resolved, development information associated with the diagnosis and resolution of the problem may be communicated to the ALA 105. For example, the amount of time taken to perform various operations in the diagnosis and resolution of the problem may be included in the development information. Other information such as the rate at which bugs and issues are getting logged from the target system 120 may be included in the development information.

At block 220, the ALA 105 may relate the performance information and the development information. For example, a database record to relate the two types of information may be generated and stored to a database of the ALA 105. Key performance metrics may be generated based on data stored in the database. The metrics may include one or more of: a mean time to closure (MTTC) that defines an average amount of time required for a development team to turn a new feature request from a customer into working software changes deployed to the target system 120, a mean time to recover that corresponds to a time required for generation of a diagnostic event and receipt of development information associated with the diagnostic event, a mean time to failure (MTTF) that defines an average amount of time between consecutive determinations that a problem exists on the target system 120 based on received performance information, a mean time to detect (MTTD) that defines an average amount of time associated with determination of a root cause associated with a diagnostic event, and/or a mean time to repair (MTTR) that defines an average amount of time required to resolve a problem associated with a diagnostic event. Other metrics may be provided. For example, other metrics may correspond to an average response time associated with users of the target system 120, an average number of server requests queued by the target system 120, and an average number of issues logged by the target system 120.

Figure 4A:
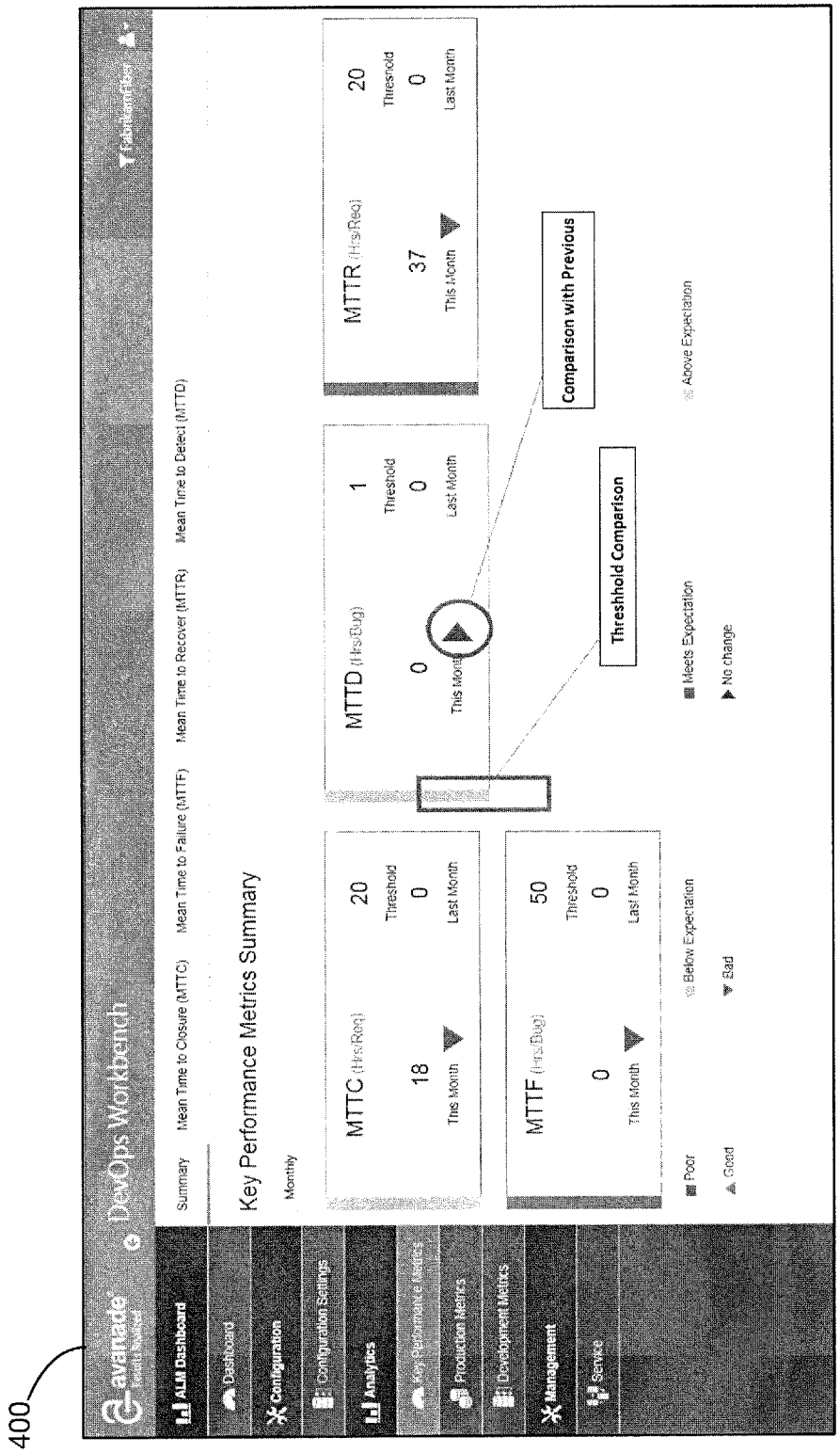
FIGS. 4A-4B illustrate exemplary user interface screens that may be provided by the ALA to convey performance and development information.
Figure 4B:
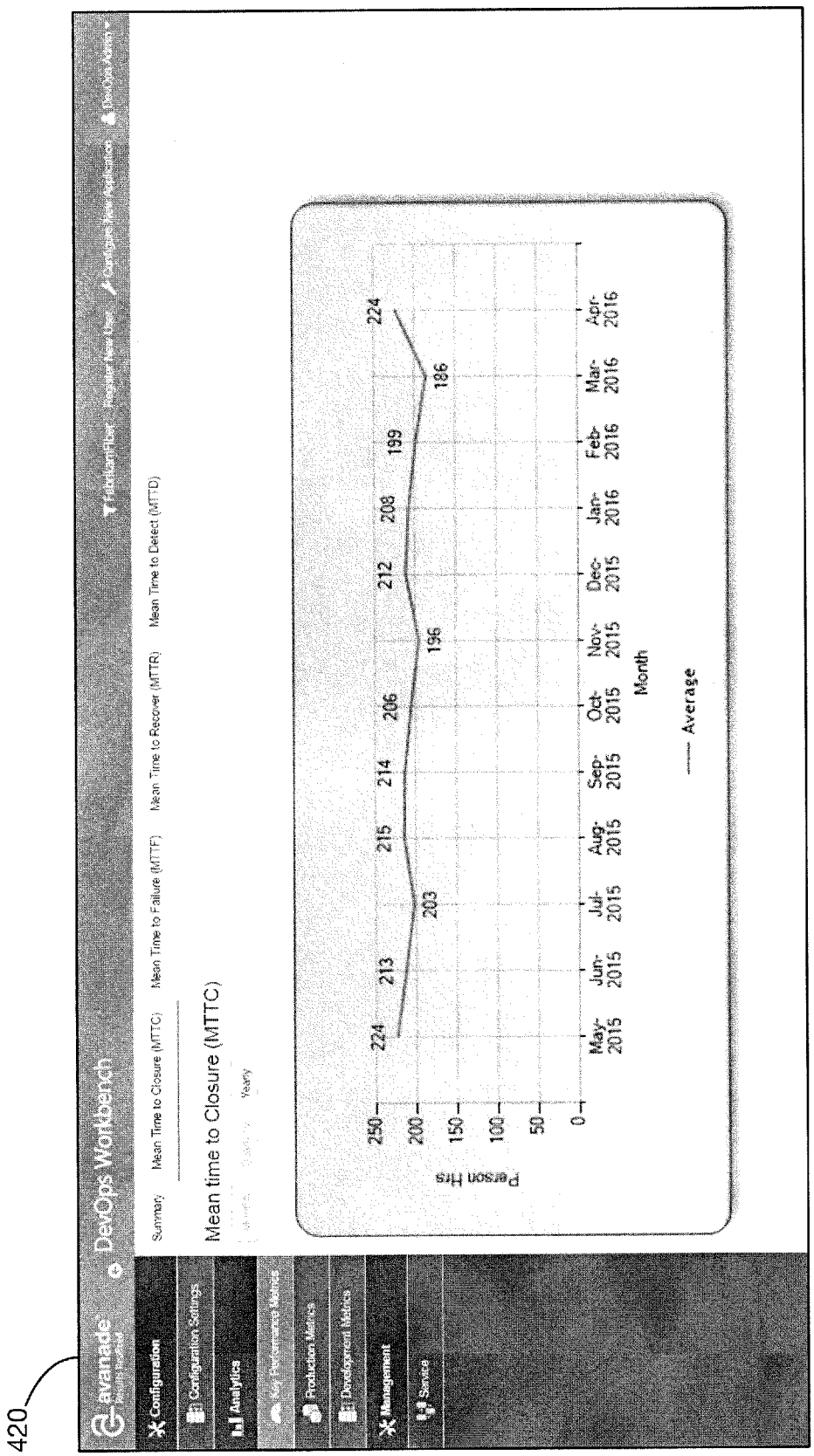

FIGS. 4A-4B illustrate exemplary user interface screens that may be provided by the ALA 105 to convey the key performance metrics. Referring to FIG. 4A, a first user interface 400 may display information associated with the MTTC, MTTD, MTTR, and MTTF metrics determined above. For each metric, an indicator such as a color, icon, etc., may be provided to convey to a user whether the metric is below the previously specified threshold for that metric. (See FIG. 3D.) A different indicator may convey to a user a month-over-month change in the value of the metric. In this regard, a second user interface 420 (FIG. 4B) may convey the value of a given metric over time to facilitate determining trends in the metric. For example, the second user interface 420 illustrates monthly values for the MTTC metric over the course of a year. Similar user interfaces may be provided to show similar trends for the MTTD, MTTR, and MTTF over the course of a desired period.

At block 225, the ALA 105 may generate a build event to the build system 115. The build system 115 may in turn carry out operations for rebuilding the application based on code that was updated to resolve the problem being experienced on the target system 120.

At block 230, the ALA 105 may receive the re-built application and deploy the application to the target system 120. In addition or alternatively, the re-built application may be communicated directly from the source control system 110 to the target system 120.

Figure 5A:
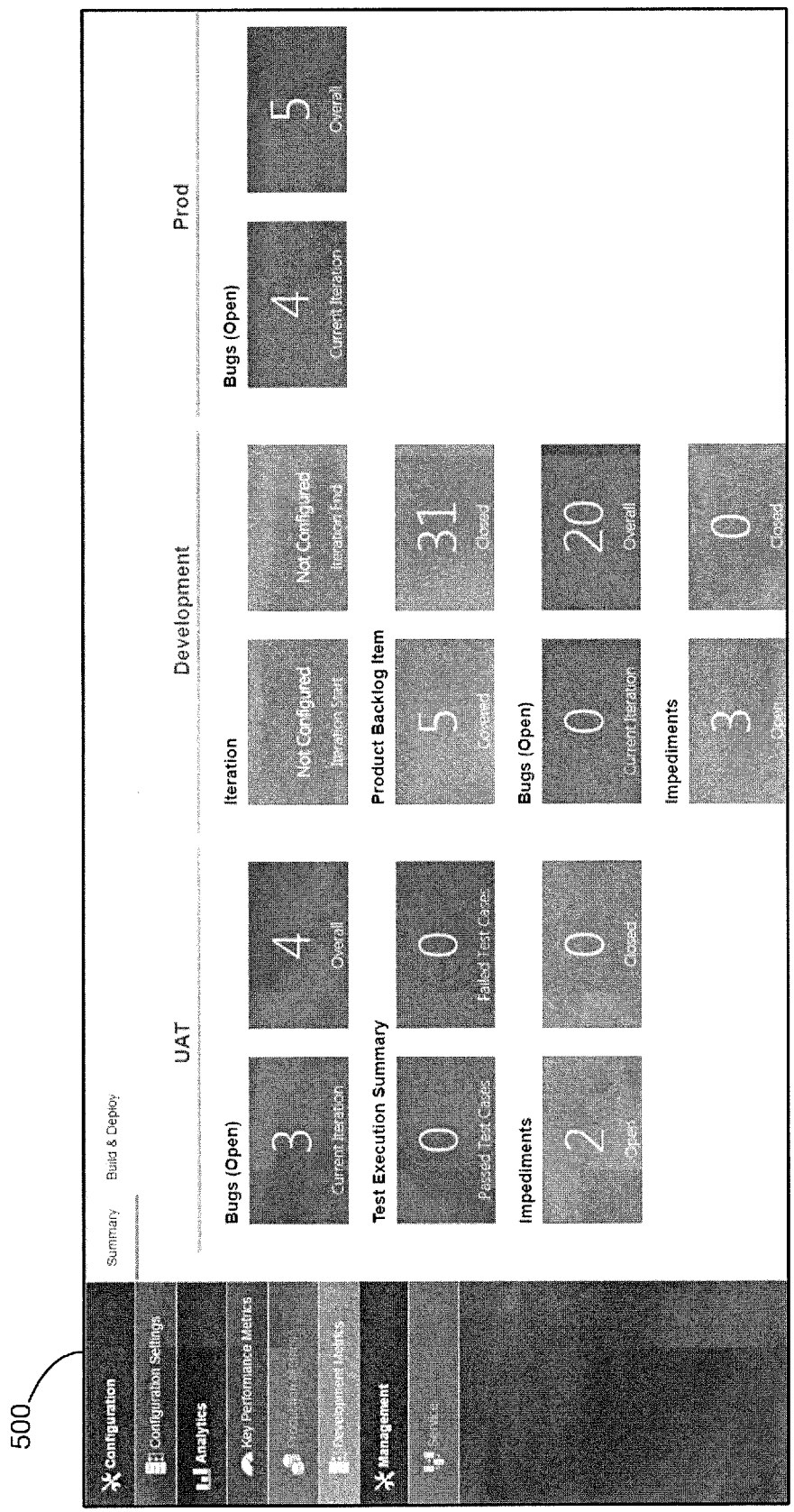
FIGS. 5A-5B illustrate exemplary user interface screens that may be provided by the ALA to convey build-related information associated with one or more applications being that have been deployed.
Figure 5B:
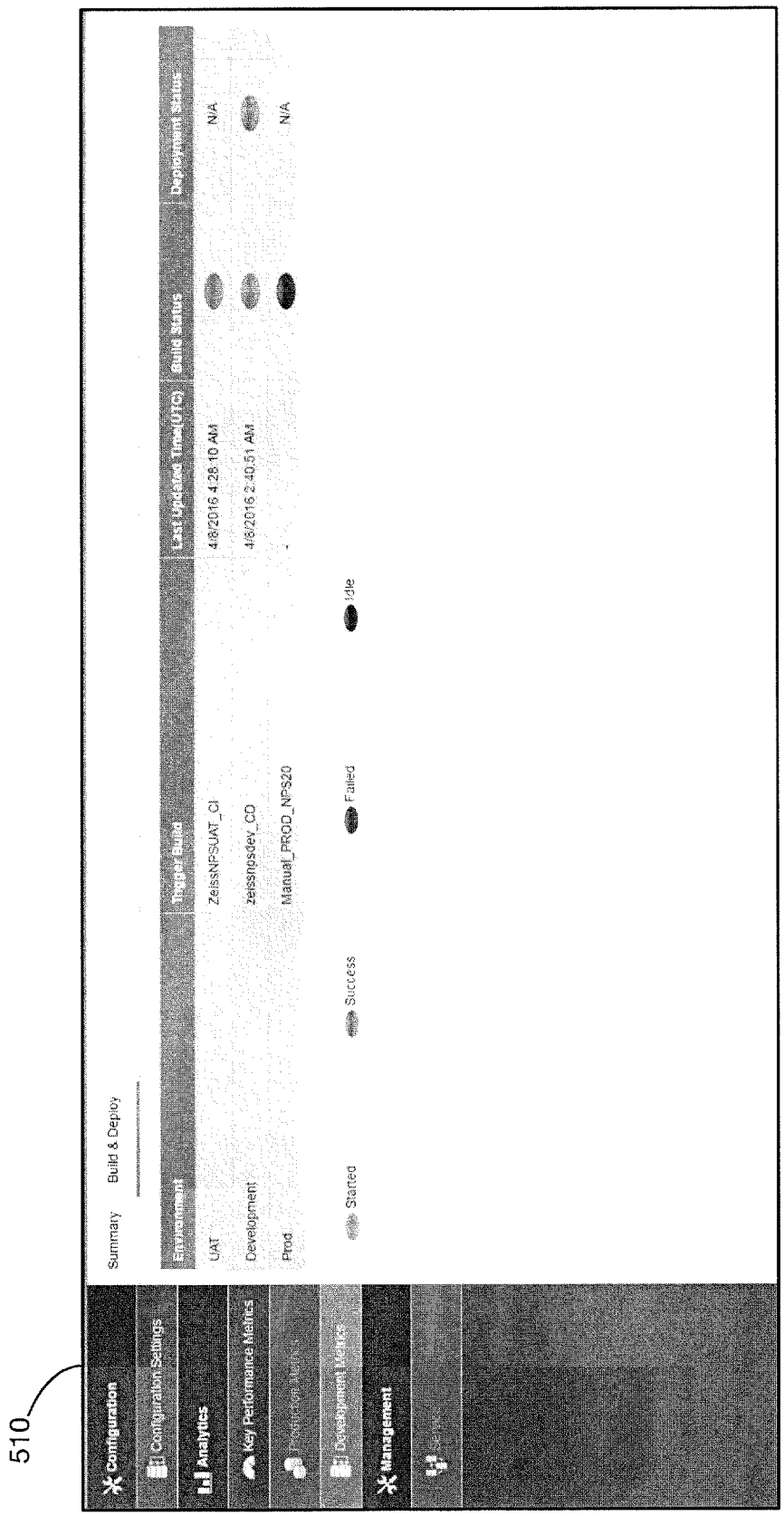

FIGS. 5A-5B illustrate exemplary user interface screens that may be provided by the ALA 105 to convey build-related information associated with one or more applications that have been deployed. Referring to FIG. 5A, a first user interface 500 may display that status associated with applications that are in various stages of development, such as user acceptance testing (UAT), early development, and production ready. For each stage, the user interface may include controls for conveying different aspects associated with development stage.

For example, a control may be provided to display current iteration start and end dates associated with a build iteration. A control may be provided to display the number of stories covered and closed in a current sprint/iteration of the build interation. A control may be provided to display the number of open and closed defects for current build iteration. A control may be provided to display the number of passed and failed test cases executed for current build iteration. A control may be provided to display the number of environment defects (i.e., defects captured by the APM tool) and application defects (i.e., those raised directly within an application via an exception code of the application). A control may be provided to display the number of open and closed issues raised for the current build iteration. Controls for displaying information related to other aspects may be provided.

Referring to FIG. 5B, a second user interface 510 may include controls for displaying that status associated with a number of deployed applications. For example, a first set of controls may display build status to indicate whether a build has been started, whether the build was successful or whether the build failed. Other aspects associated with the build status may be conveyed. A second set of controls may display deployment status to indicate whether the application was deployed successfully, whether the deployment of the application filed, etc.

After deployment of the application, the ALA 105 may receive performance information associated with an application operating on the target system 120 along with performance information associated with the target system 120 upon which the application is being executed from the application performance monitoring (APM) tool operating on the target system 120.

Figure 6A:
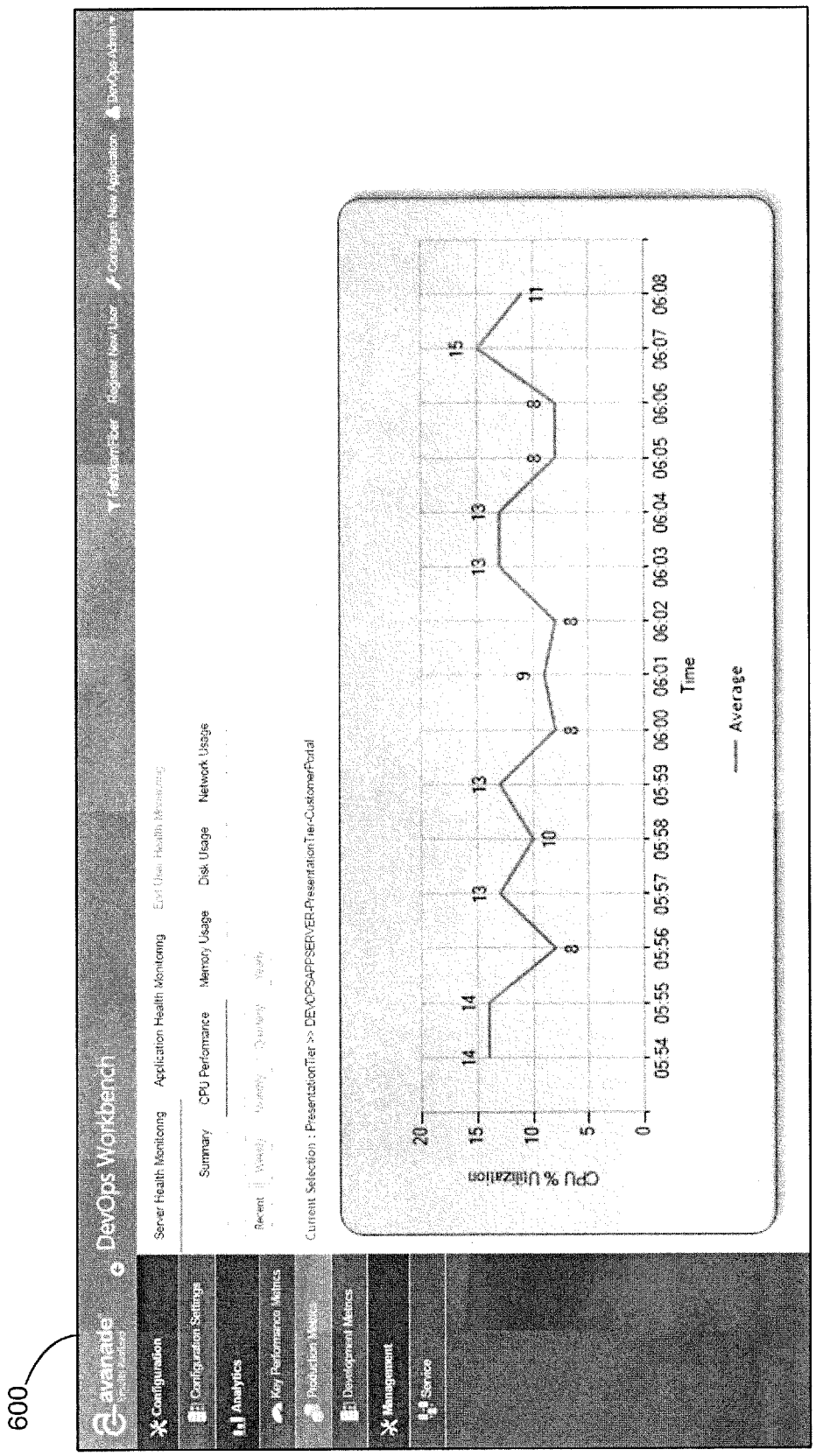
FIGS. 6A-6D illustrate exemplary user interface screens that may be provided by the ALA to convey the performance information associated with operation of a target system of the environment.
Figure 6B:
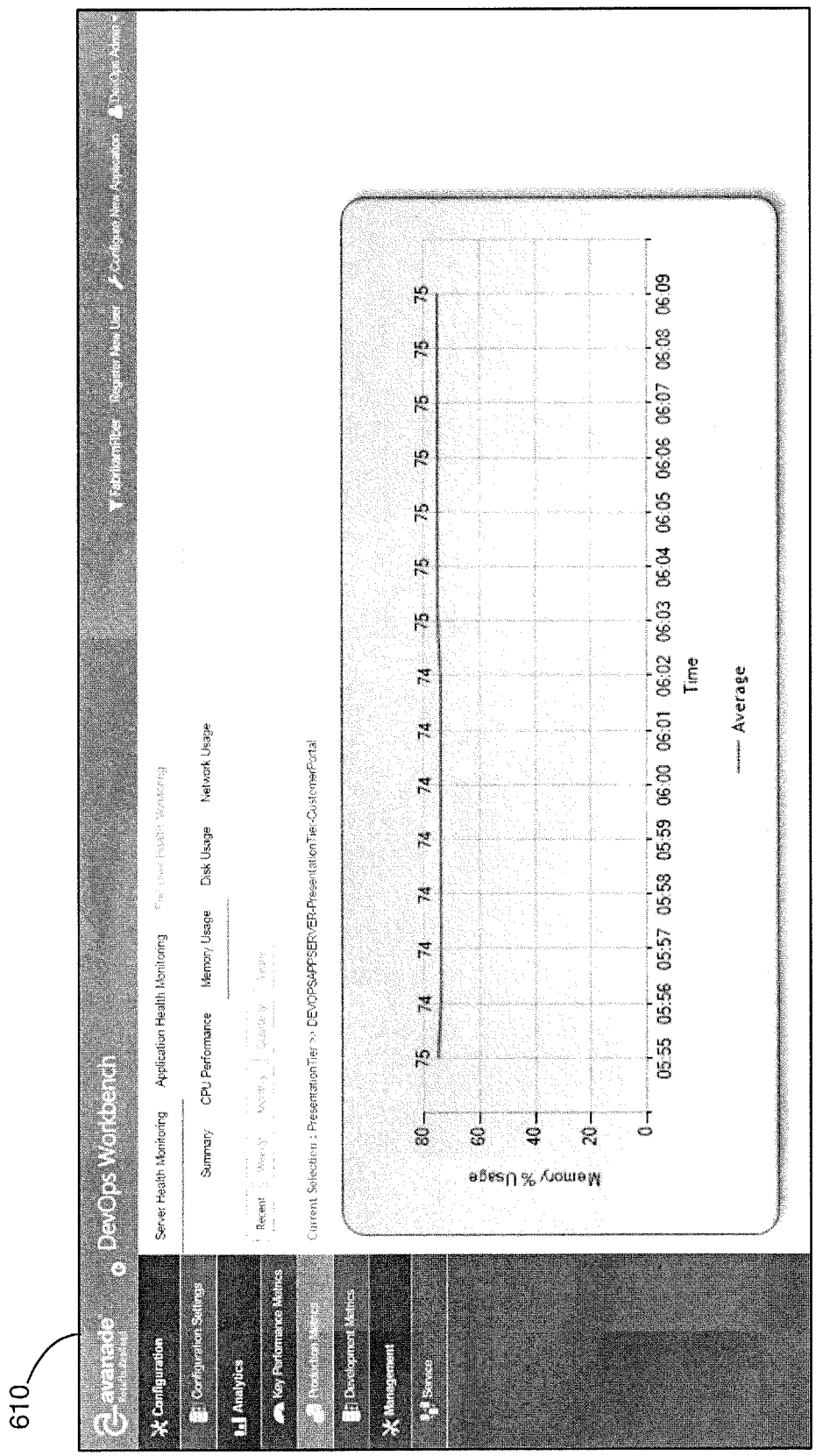
Figure 6C:
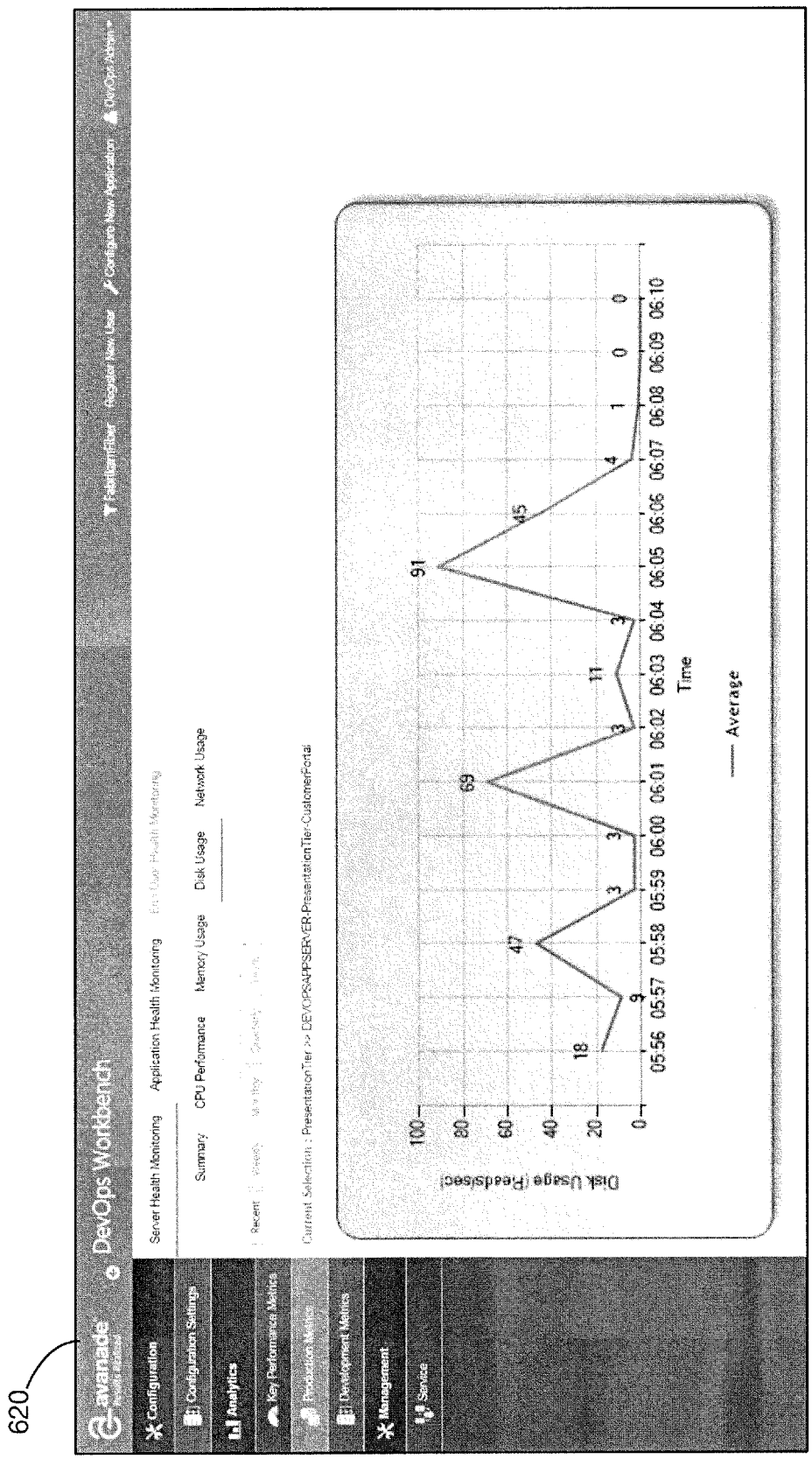
Figure 6D:
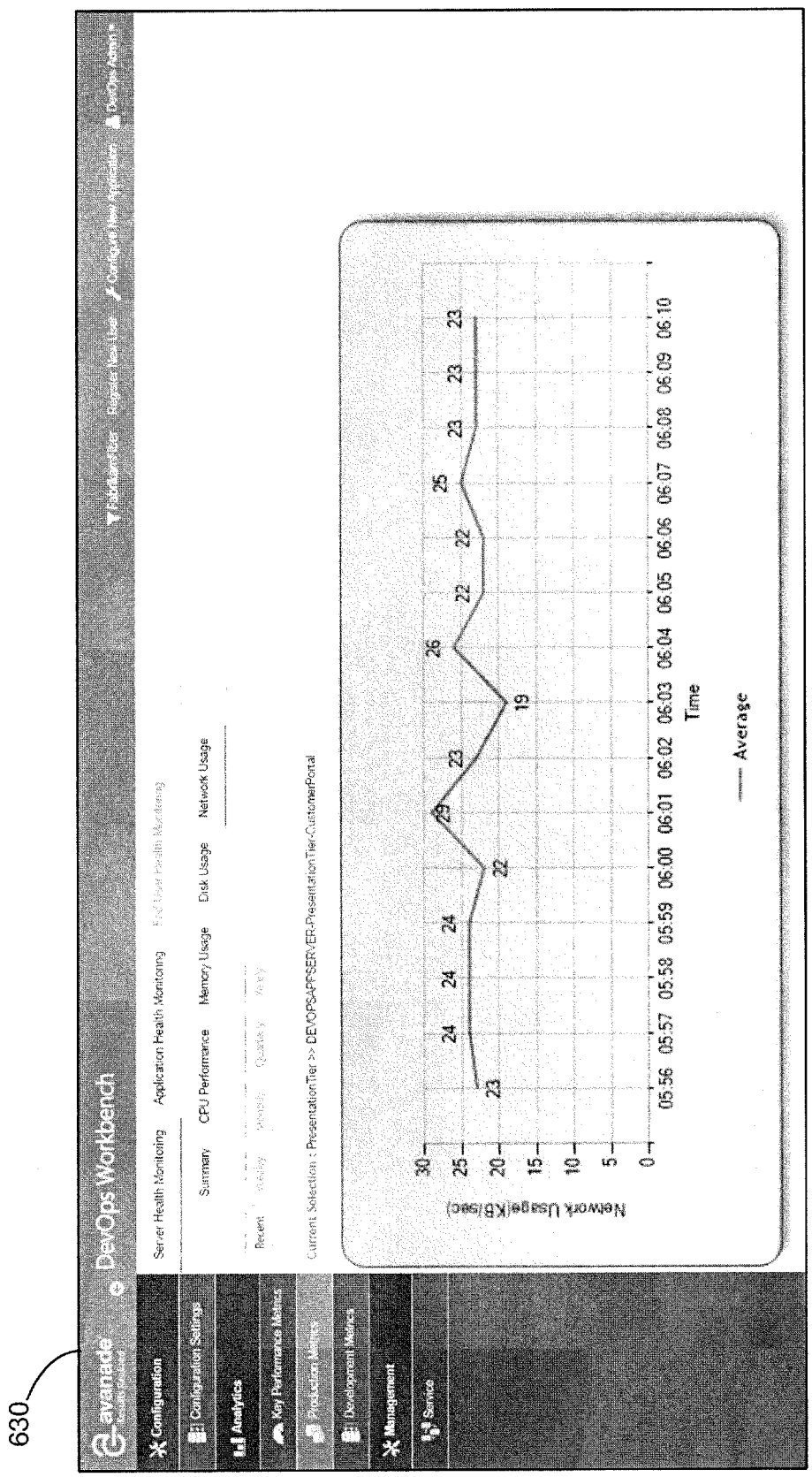

FIGS. 6A-6D illustrate exemplary user interface screens that may be provided by the ALA 105 to convey the performance information associated with operation of the server. Referring to FIG. 6A, a first user interface 600 may display a chart of recent and historic trends of CPU usage. Referring to FIG. 6B, a second user interface 610 may display a chart of recent and historic trends of memory usage. Referring to FIG. 6C, a third user interface 620 may display a chart of recent and historic trends of disk usage. Referring to FIG. 6D, a fourth user interface 630 may display a chart of recent and historic trends of network usage.

Figure 7A:
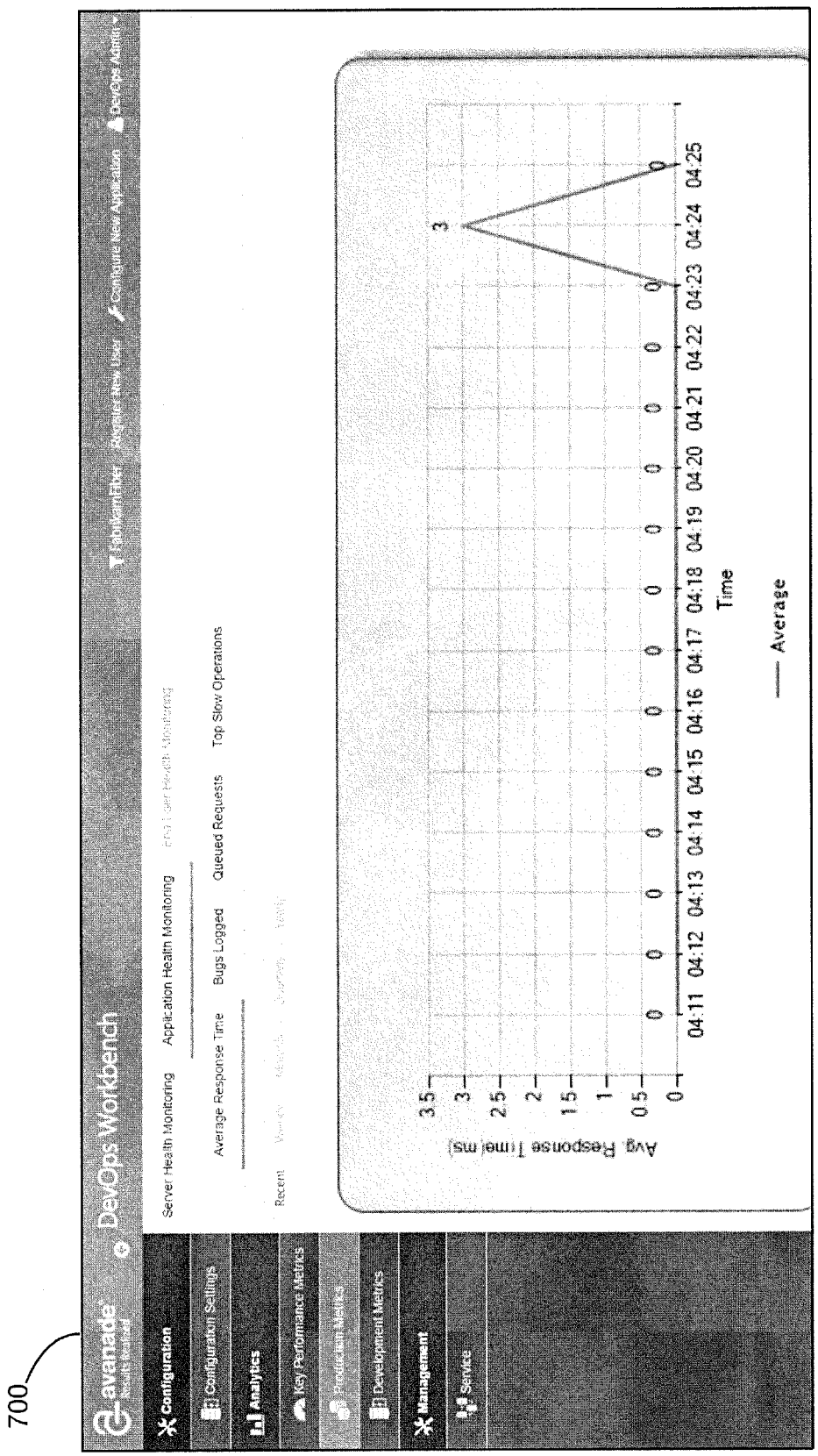
FIGS. 7A-7D illustrate exemplary user interface screens that may be provided by the ALA to convey performance information associated with an application operating on the target system.

FIGS. 7A-7D illustrate exemplary user interface screens that may be provided by the ALA 105 to convey the performance information associated with the application. Referring to FIG. 7A, a first user interface 700 may display a chart of recent and historic trends of average end-to-end response time. The end-to-end response time may correspond to an amount of time that passes between a request from a user for a web page and conveyance by the application of the requested web page.

Figure 7B:
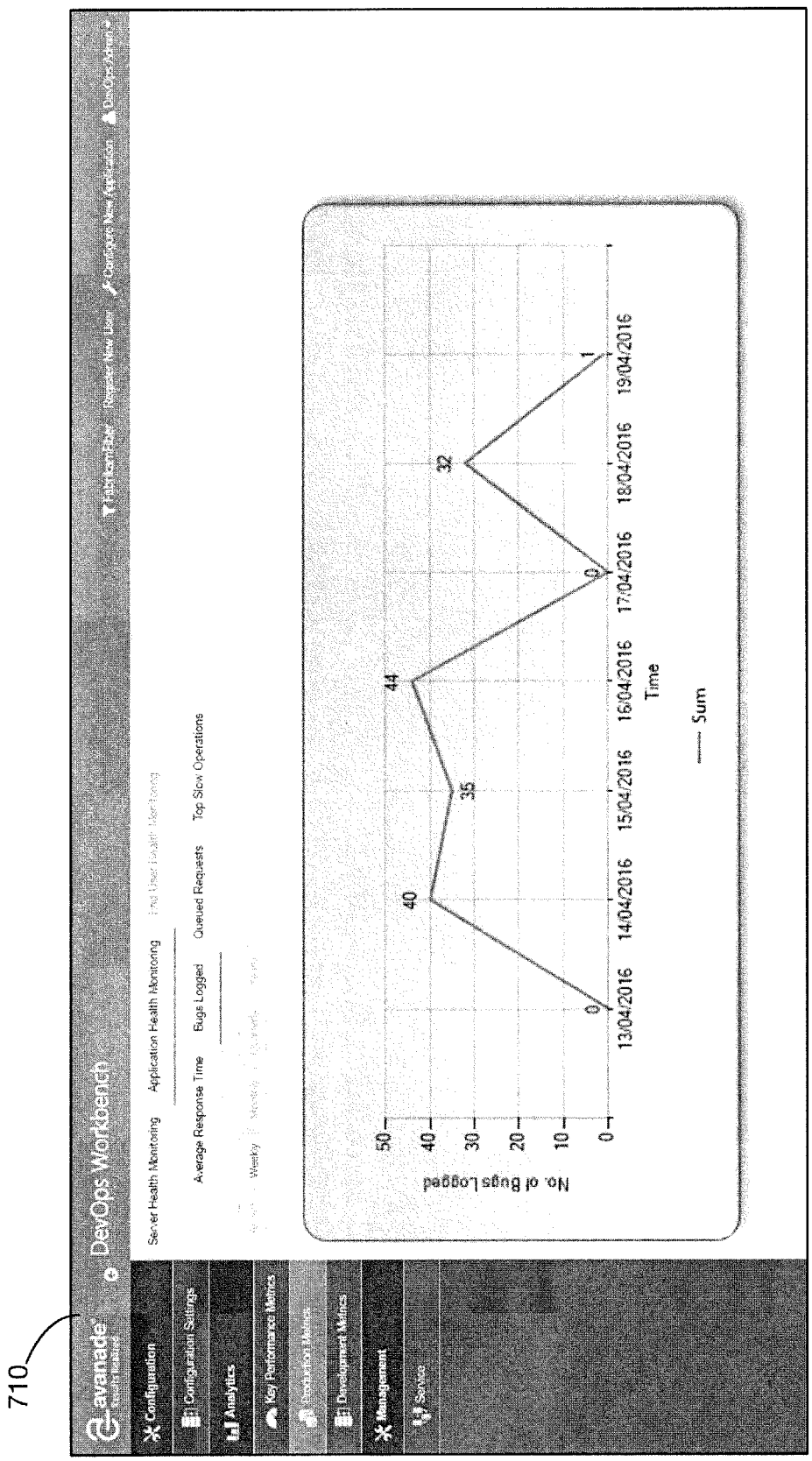

Referring to FIG. 7B, a second user interface 710 may display a chart of recent and historic trends of unhandled exceptions captured by the APM tool. The exceptions may be generated by the application (e.g., debugging code within the application for capturing unhandled conditions) and/or by the target system 120 when the application becomes unresponsive.

Figure 7C:
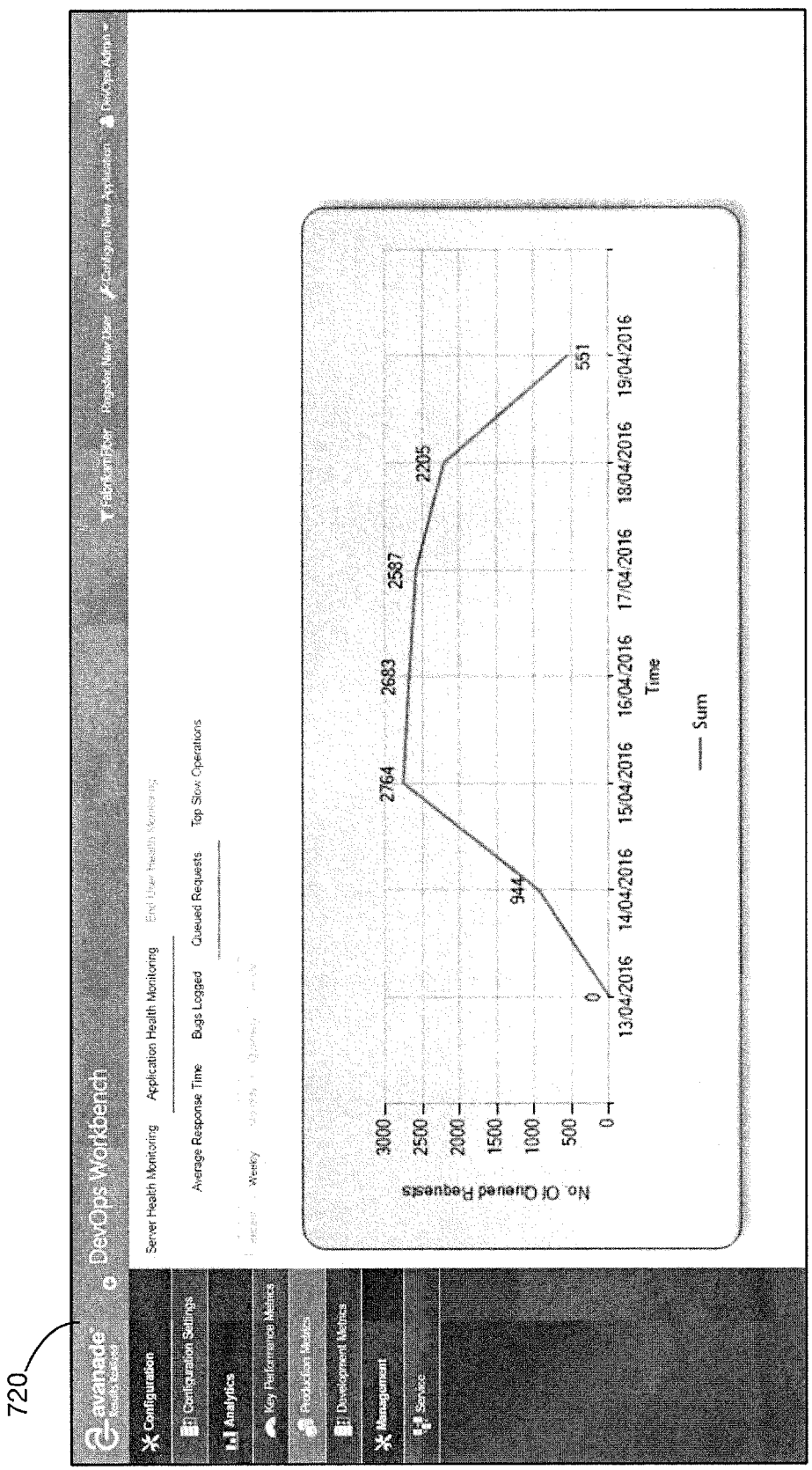

Referring to FIG. 7C, a third user interface 720 may display a chart of the number of requests queued at the application server. Queued requests may correspond to user-generated requests for a web page that have yet to be processed by the application.

Figure 7D:
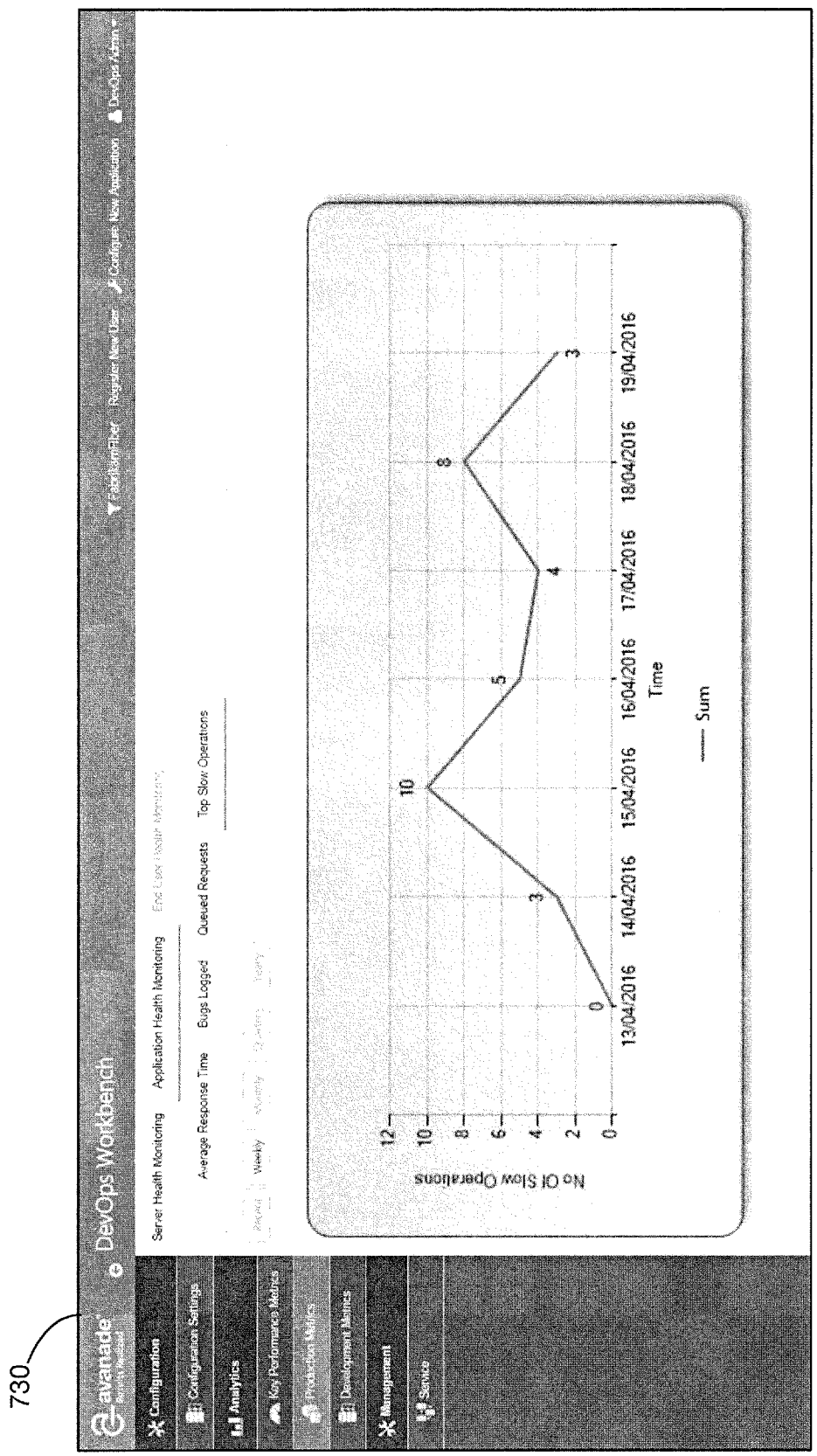

Referring to FIG. 7D, a fourth user interface 730 may display a chart of recent and historic trends of the slowest operations captured by the APM.

Figure 8:
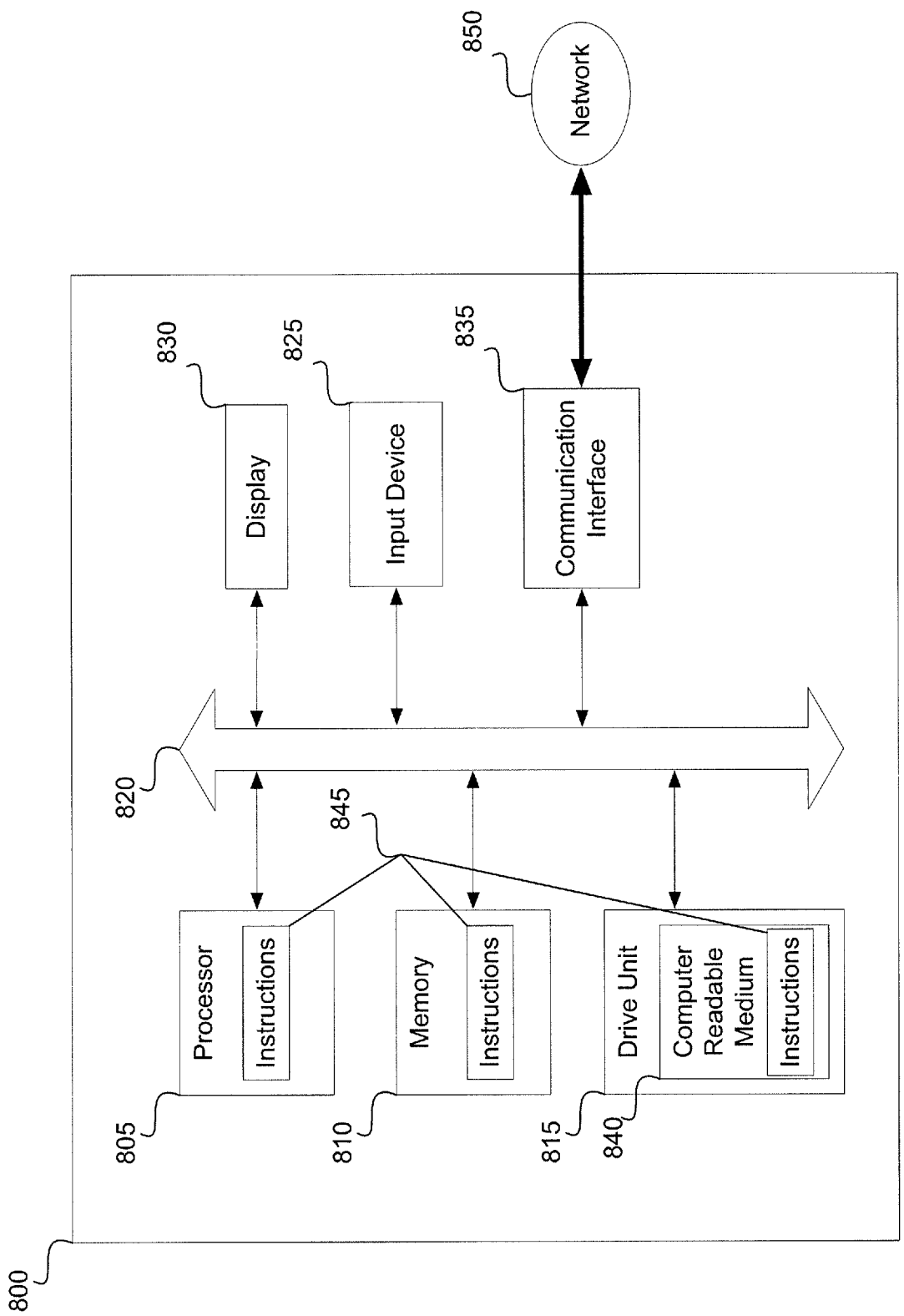
FIG. 8 illustrates a computer system that may correspond to one or more subsystems of the system.

FIG. 8 illustrates a computer system 800 that may form part of or implement the systems described above. The computer system 800 may include a set of instructions 845 that the processor 805 may execute to cause the computer system 800 to perform any of the operations described above. The computer system 800 may operate as a standalone device or may be connected, e.g., using a network, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile device, capable of executing the instructions 845 (sequential or otherwise) that specify actions to be taken by that machine. Further, each of the systems described may include any collection of subsystems that individually or jointly execute a set, or multiple sets, of instructions to perform one or more computer functions.

The computer system 800 may include one or more memory devices 810 on a bus 820 for communicating information. In addition, code operable to cause the computer system to perform any of the operations described above may be stored in the memory 810. The memory 810 may be a random-access memory, read-only memory, programmable memory, hard disk drive or any other type of memory or storage device.

The computer system 800 may include a display 830, such as a liquid crystal display (LCD), a cathode ray tube (CRT), or any other display suitable for conveying information. The display 830 may act as an interface for the user to see the functioning of the processor 805, or specifically as an interface with the software stored in the memory 810 or in the drive unit 815.

Additionally, the computer system 800 may include an input device 825, such as a keyboard or mouse, configured to allow a user to interact with any of the components of system 800.

The computer system 800 may also include a disk or optical drive unit 815. The disk drive unit 815 may include a computer-readable medium 840 in which the instructions 845 may be stored. The instructions 845 may reside completely, or at least partially, within the memory 810 and/or within the processor 805 during execution by the computer system 800. The memory 810 and the processor 805 also may include computer-readable media as discussed above.

The computer system 800 may include a communication interface 835 to support communications via a network 850. The network 850 may include wired networks, wireless networks, or combinations thereof. The communication interface 835 network may enable communications via any number of communication standards, such as 802.11, 802.12, 802.20, WiMAX, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While methods and systems have been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present methods and systems not be limited to the particular embodiment disclosed, but that the disclosed methods and systems include all embodiments falling within the scope of the appended claims.

We claim:

1. A method for improving an operational efficiency of a target system comprising:
   receiving, by an application lifecycle analyzer (ALA), performance information from the target system;
   determining, by the ALA, whether the target system is experiencing a problem based on the received performance information;
   communicating, by the ALA, a diagnostic event to a source control system when the ALA determines that a problem exists with the target system;
   receiving, from the source control system, development information that specifies one or more time periods associated with operations for diagnosing and resolving the problem experienced by the target system;
   in response to receiving the development information, communicating, by the ALA, a build event to a build system;
   receiving an application built by the build system;
   deploying the application to the target analyzer;
   generating, by the ALA, a database record in a metric database that relates the diagnostic event and the development information; and
   computing one or more metrics based on one or more database records stored in the metric database.

2. The method according to claim 1, further comprising receiving configuration information that defines a performance measurement system implemented by the target system.

3. The method according to claim 2, wherein the configuration information further comprises a type of source control system.

4. The method according to claim 3, wherein the configuration information further comprises a type of build system.

5. The method according to claim 1, wherein the one or more metrics include one or more of:
   a mean time to closure that defines an average amount of time between for converting a user requirement into a new feature deployed to the target system;
   a mean time to failure that defines an average amount of time between consecutive determinations that a problem exists on the target system based on received performance information;
   a mean time to detect that defines an average amount of time associated with determination of a root cause associated with a diagnostic event;
   a mean time to repair that defines an average amount of time required to resolve a problem associated with a diagnostic event;
   an average response time associated with users of the target system;
   an average number of server requests queued by the target system;
   an average number of issues logged by the target system.

6. The method according to claim 1, wherein the performance information defines one or more of: a CPU performance of the target system, memory usage of the target system, a disk usage of the target system, and a network usage of the target system.

7. The method according to claim 1, wherein the target system executes instruction code for logging errors with the system, wherein the performance information includes errors logged by the target system based on the instruction code.

8. The method according to claim 1, wherein the development information specifies one or more of: one or more time periods associated with development and operations for converting a user requirement into a working feature deployed on the production system; a time spent on fixing a problem vs. a time spent on developing one or more new features to be deployed to the target system; and a time required for performing the actual deployment to the targeted system.

9. The method according to claim 1, further comprising calculating an operational and development efficiency of the target system based on one or more parameters from each of an application performance monitoring tool of the target system, the build system, and the source control system.

10. The method according to claim 1, further comprising integrating the application built by the build system with provisioning and configuration system for orchestrating environment provision and configuration prior to deploying the application to the target analyzer.

11. A system for improving an operational efficiency of a target system comprising:
    an ALA configured to:
      receive performance information from the target system;
      determine whether the target system is experiencing a problem based on the received performance information; and
      communicate a diagnostic event to a source control system when the ALA determines that a problem exists with the target system; and
    a source control system configured to:
      cause one or more operations for diagnosing and resolving the problem experienced by the target system to be performed; and
      communicate development information that specifies one or more time periods associated with the one or more operations;
    wherein the ALA is further configured to:
      communicate a build event to a build system in response to receiving the development information;
      receive an application built by the build system; and
      deploy the application to the target analyzer;
        generate a database record in a metric database that relates the diagnostic event and the development information; and
        computing one or more metrics based on one or more database records stored in the metric database.

12. The system according to claim 11, wherein the ALA is further configured to receive configuration information that defines a performance measurement system implemented by the target system.

13. The system according to claim 12, wherein the configuration information further comprises a type of source control system.

14. The system according to claim 11, wherein the one or more metrics include one or more of:
- a mean time to closure that defines an average amount of time between generation of a diagnostic event and receipt of development information associated with the diagnostic event;
- a mean time to failure that defines an average amount of time between consecutive determinations that a problem exists on the target system based on received performance information;
- a mean time to detect that defines an average amount of time associated with determination of a root cause associated with a diagnostic event;
- a mean time to repair that defines an average amount of time required to resolve a problem associated with a diagnostic event;
- an average response time associated with users of the target system;
- an average number of server requests queued by the target system;
- an average number of issues logged by the target system.

15. The system according to claim 11, wherein the performance information defines one or more of: a CPU performance of the target system, memory usage of the target system, a disk usage of the target system, and a network usage of the target system.

16. The system according to claim 11, wherein the target system executes instruction code for logging errors with the system, wherein the performance information includes errors logged by the target system based on the instruction code.

17. A non-transitory storage medium that stores instruction code for improving an operational efficiency of a target system, the instruction code being executable by a machine to cause the machine to perform acts comprising:
- receiving performance information from the target system;
- determining whether the target system is experiencing a problem based on the received performance information;
- communicating a diagnostic event to a source control system when the ALA determines that a problem exists with the target system;
- receiving, from the source control system, development information that specifies one or more time periods associated with operations for diagnosing and resolving the problem experienced by the target system;
- in response to receiving the development information, communicating a build event to a build system;
- receiving an application built by the build system;
- deploying the application to the target analyzer;
- generating a database record in a metric database that relates the diagnostic event and the development information; and
- computing one or more metrics based on one or more database records stored in the metric database.

18. The non-transitory storage medium according to claim 17, wherein the instruction code is further executable by the machine to cause the machine to perform an act comprising receiving configuration information that defines a performance measurement system implemented by the target system.

* * * * *